United States Patent [19]

Guerrero et al.

[11] Patent Number: 5,450,993
[45] Date of Patent: Sep. 19, 1995

[54] CARRY HOLDER

[75] Inventors: Graciela L. Guerrero, Elk Grove Village; Julio C. Castaneda, Streamwood; Randall P. Chambers, Schaumburg, all of Ill.

[73] Assignee: Motorola, Inc., Schaumburg, Ill.

[21] Appl. No.: 192,519

[22] Filed: Feb. 7, 1994

[51] Int. Cl.$^6$ .......................................... B65D 45/32
[52] U.S. Cl. ................... 224/246; 224/242; 224/252; 224/250; 224/253; 206/305; 206/576; 248/505
[58] Field of Search ............... 224/246, 242, 252, 250, 224/253; 206/305, 320, 576; 248/505, 551, 309.1; 24/17 B, 482; 215/216, 227, 306

[56] References Cited

U.S. PATENT DOCUMENTS

| D. 203,101 | 12/1965 | Holder | 224/250 |
|---|---|---|---|
| 439,786 | 11/1890 | Low | 24/17 B |
| 4,046,295 | 9/1977 | Eichler | 224/242 |
| 4,234,116 | 11/1980 | Myers | 224/250 |
| 4,310,110 | 1/1982 | Dexter | 224/246 |
| 4,420,078 | 12/1983 | Belt et al. | 206/305 |
| 4,500,019 | 2/1985 | Curley, Jr. | 224/242 |
| 4,620,653 | 11/1986 | Farrell | 224/242 |
| 5,038,400 | 8/1991 | Baracat et al. | |
| 5,248,264 | 9/1993 | Long et al. | |

FOREIGN PATENT DOCUMENTS

| 935565 | 8/1963 | United Kingdom | 248/505 |
|---|---|---|---|

*Primary Examiner*—Henry J. Recla
*Assistant Examiner*—Charles R. Eloshway
*Attorney, Agent, or Firm*—Andrew S. Fuller

[57] ABSTRACT

A carry holder (100) includes a housing (110) having a pocket (120) for receiving a portable product (160), and a latching mechanism (130, 140, 150) to help secure the portable product (160) within the pocket (120). The latching mechanism (130, 140, 150) includes a latch retainer (130), integral to the housing (110), a latch (140) formed to engage the latch retainer (130), and an elastic member (150) having a portion (152) mechanically coupled to the latch (140), and another portion (153) mechanically coupled to the housing (110). The latch (140) and elastic member (150) are pivotable about the pocket (120) such that latch (140) is selectively engageable with the latch retainer (130) to secure the portable product (160) within the pocket (120).

5 Claims, 5 Drawing Sheets

CARRY HOLDER

TECHNICAL FIELD

This invention relates generally to carry holders, and more particularly, to carry holders for portable products.

BACKGROUND

Portable electronic products, such as portable radios, and other communication products, are becoming increasingly popular. Many users require frequent and convenient access to the product, and consequently transport these products on their person. Therefore, it is important for manufacturers to facilitate the transportation and use of these portable products.

A convenient method for transporting the radio, or other such product, is to place it in a carry holder. The carry holder includes a pocket for holding the radio. The carry holder also typically includes a latching mechanism for securing the radio to the carry holder, and an attachment mechanism, such as a belt clip, for attaching the carry holder to a belt or other article of clothing. Often, the carry holder is formed to accommodate a radio having fixed dimensions. However, in some situations, it is convenient to have a carry holder capable of transporting radios of different sizes.

Prior art carry holders are typically formed to fit a particular size product, and some are formed to allow dimensional variation in one or more directions. For example, the carry holder may be sized sufficiently large to allow for dimensional variations. Alternatively, an open pocket carry holder may be used. In this case, a latching mechanism is employed to secure the product within the pocket. Snaps and rivets have been commonly used for this application. However, snap and rivet mechanisms tend to be cumbersome to use and may be unreliable. For example, the snaps may be inadvertently released causing the product to fall from the carry holder. Moreover, when the carry holder is formed from a plastic or similar type material, snaps and rivets may create stress points which can adversely affect the structural integrity of the carry holder.

It is desirable to have a carry holder capable of accommodating portable products of different dimensions. It is also desirable to have a reliable and convenient latch mechanism to secure a product within the carry holder. Preferably, the carry holder must be capable of being manufactured in an efficient and cost effective manner. Therefore, there exists a need for a carry holder having a simple construction, which offers flexibility and convenience.

DETAILED DESCRIPTION OF THE PREFERRED EMBODIMENT

Generally, the present invention provides for a carry holder for a portable product. The carry holder includes a housing having a pocket for receiving the portable product, and an integral latching mechanism for securing the portable product within the pocket. Preferably, the pocket has an open top and is substantially open face, such that the carry holder is capable of receiving products of different sizes. The latch mechanism includes a latch retainer integral to the housing, a latch member formed to engage the latch retainer, and an elastic member mechanically coupled to the latch member and to the housing. The latch member and a portion of the elastic member are pivotable about the pocket such that the latch member is selectively engageable with the latch retainer to secure the portable product within the pocket.

Figure 1:
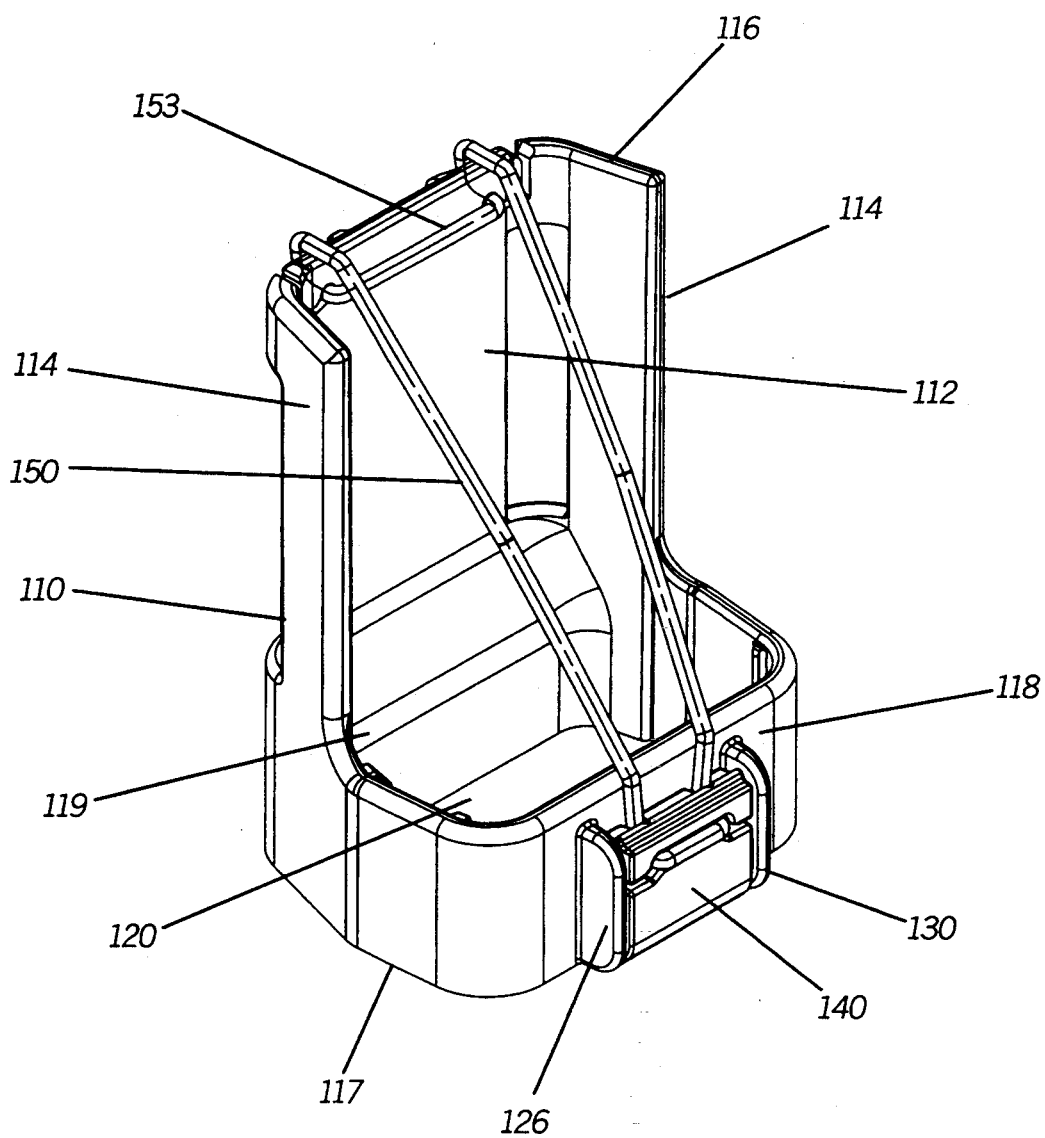
FIG. 1 is a perspective view of the a carry holder, in accordance with the present invention.

The present invention can be better understood with references to FIGS. 1–5. FIG. 1 is a perspective view of a carry holder or holster 100, in accordance with the present invention. The carry holder 100 includes a housing 110, and a latching mechanism including a latch retainer 130 integral to the housing 110, a latch member or latch 140, and an elastic member 150. In the preferred embodiment, the housing 110 is formed from a plastic material, such as polycarbonate, using an injection molding process. Other materials and methods of construction may be used. Accordingly, the housing 110 can be formed in a single manufacturing operation. The housing 110 includes a rear wall 112 with depending side walls 114. The side walls 114 terminate to form an open face toward the top 116 of the housing 110, and extend to an adjoining front wall 118 toward the base 117 of the housing 110. The rear wall 112, side walls 114, and front wall 118, form a cavity or pocket 120 for receiving a portable product. In the preferred embodiment, the pocket 120 of the carry holder 100 is formed to receive a portable radio. As such, the carry holder 100 has an open top, an open base, and a partially open front, i.e., there is no top wall nor base wall, and there is only a partial front wall 118. Thus, the pocket 120 is very useful for receiving product configurations of varying sizes or dimensions, particularly when those variations extend the dimensions of the product vertically. A ridge portion 119 near the base 117 of the housing 110 helps retain the portable product within the pocket 120 of the carry holder 100.

Figure 2:
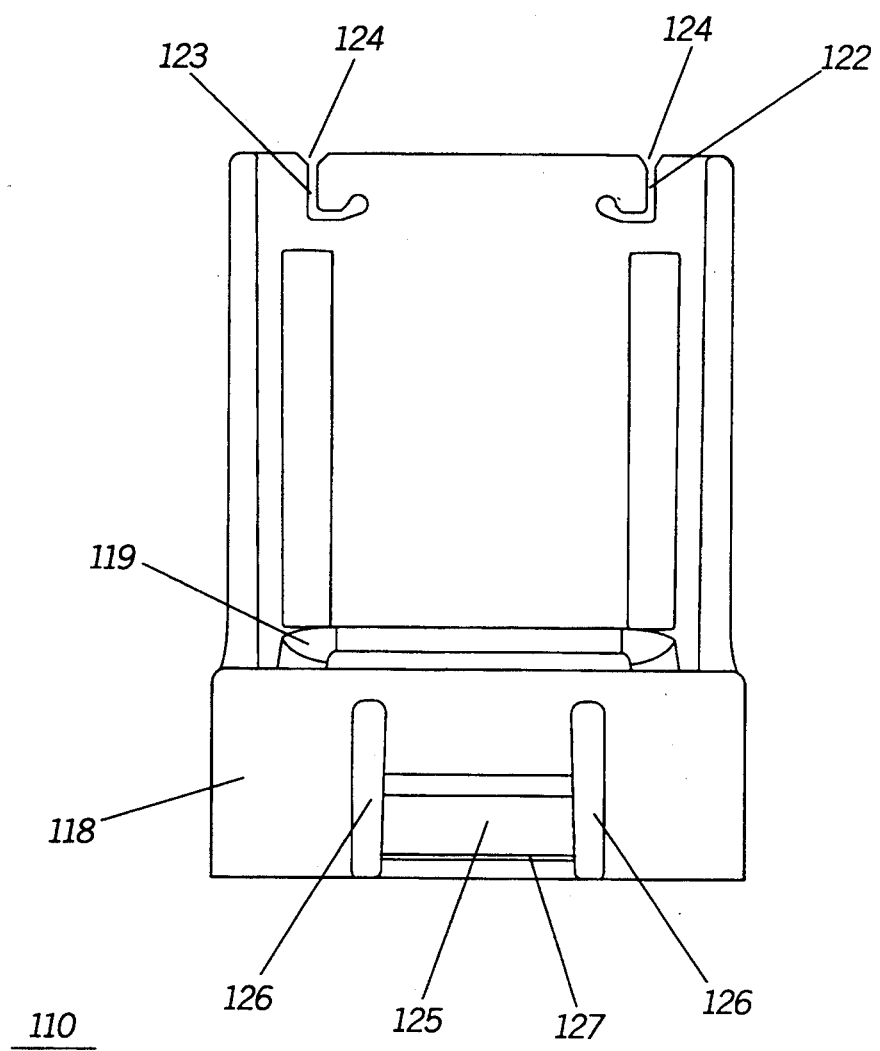
FIG. 2 is front view of the housing portion of the carry holder of FIG. 1.

Referring to FIG. 2, a front view of the housing 110 is shown. The housing 110 includes mount points for the elastic member 150, and an integral latch retainer 130. In the preferred embodiment, the mount points comprise first and second spaced apart slotted portions or slots 122, 123 situated near the top of the rear wall 112. Each slotted portion extends from the top surface of the rear wall 112 to form a hook within the rear wall 112. The slotted portions 122, 123 have open ends 124 such that the elastic member 150 may be mounted within the slotted portions 122, 123. The open ends 124 of the slotted portions 122, 123 provide an ingress for the elastic member 150 to be mounted, while the contour or shape of the slotted portions 122, 123 provide for a restricted egress when the elastic member 150 is mounted.

The integral latch retainer 130 is formed on the front wall 118 of the housing 110. The latch retainer 130 includes a hook catch 125 which projects from the surface of the front wall 118, and two retaining wall segments or side rails 126, also projecting from the front wall 118 on opposing sides of the hook catch 125. The hook catch 125 is shaped as a hollow overhang with a cavity 127 accessible from below the hook catch 125. When the latch member 140 is engaged with or hooked to the latch retainer 130, the hook catch 125 restricts vertical movement of the latch member 140, and the wall segments 126 limit lateral movement of the latch member 140.

Figure 3:
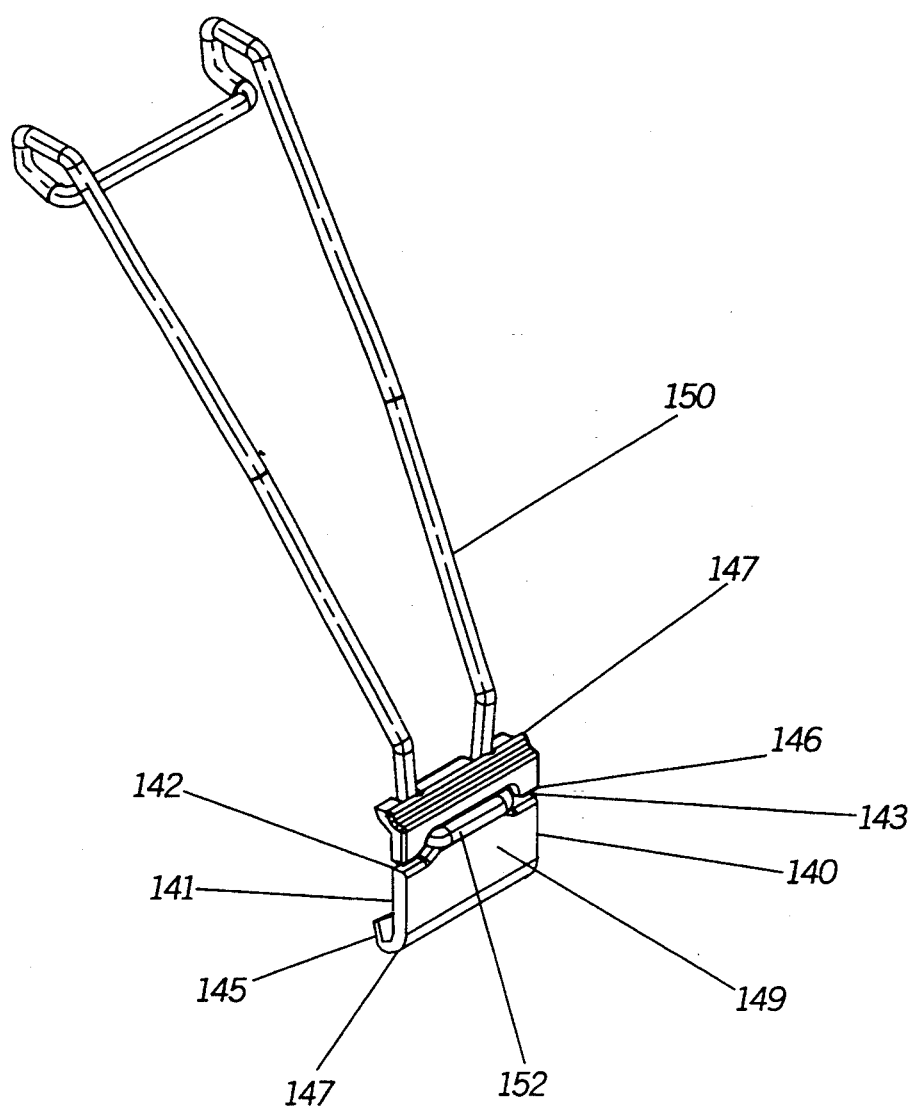
FIG. 3 is a perspective of the latch member and elastic member of the carry holder of FIG. 1.

Referring to FIG. 3, a perspective view of the latch member 140 and elastic member 150 is shown. The latch member 140 has a hook portion 145 for engaging or hooking the latch retainer 130 and first and second spaced apart slotted portions or slots 142, 143 for retaining the elastic member 150. The hook portion 145 is formed at one end of the latch member 140. The slotted portions 142, 143 originate from the sides 141 of the latch member 140 and progress inward. Thus, each slotted portion has an open end 146 which provides for an ingress for the elastic member 150. The contour or shape of the slotted portions 142, 143 provide for a restricted egress for restricting the disengagement of the elastic member 150 from the latch member 140 when the elastic member 150 is mounted to the latch member 140. Ribs 147 located on the latch member 140 facilitate the latching process. In the preferred embodiment, the latch member 140 is formed from a plastic material, such as polycarbonate, and can be formed by injection molding.

The elastic member 150 is formed from a flexible resilient material. In the preferred embodiment, the elastic member 150 is formed from an elongated looped elastic strap or cord. A portion 152 of the elastic member 150 is mechanically coupled, or mounted, to the latch member 140. The mounting of the elastic member 150 to the latch member 140 is easily accomplished by looping the elastic member 150 through the slotted portions 142, 143 such that a portion 152 of the elastic member 150 is wrapped or looped around the outer surface 149 of the latch member 140. Preferably, a taut fit is established by pulling the elastic member 150 firmly against the latch member 140. Referring back to FIG. 1, the carry holder 100 is assembled such that the elastic member 150 has a portion mechanically coupled to the housing 110. The elastic member 150 is mounted to the slotted portions 142, 143 of the housing 110 in a manner similar to that of the latch member 140. A portion 153 of the elastic member 150 is looped about the housing 110 through the first and second slotted portions 122, 123 of the housing 110, and a taut fit is established by pulling the elastic member 150 firmly against the housing 110. So assembled, the latch member 140, and a portion of the elastic member 150, are pivotable about the pocket 120 such that the latch member 140 is selectively engageable, i.e., capable of being hooked, with the latch retainer 130 to secure a portable product within the pocket 120.

Figure 4:
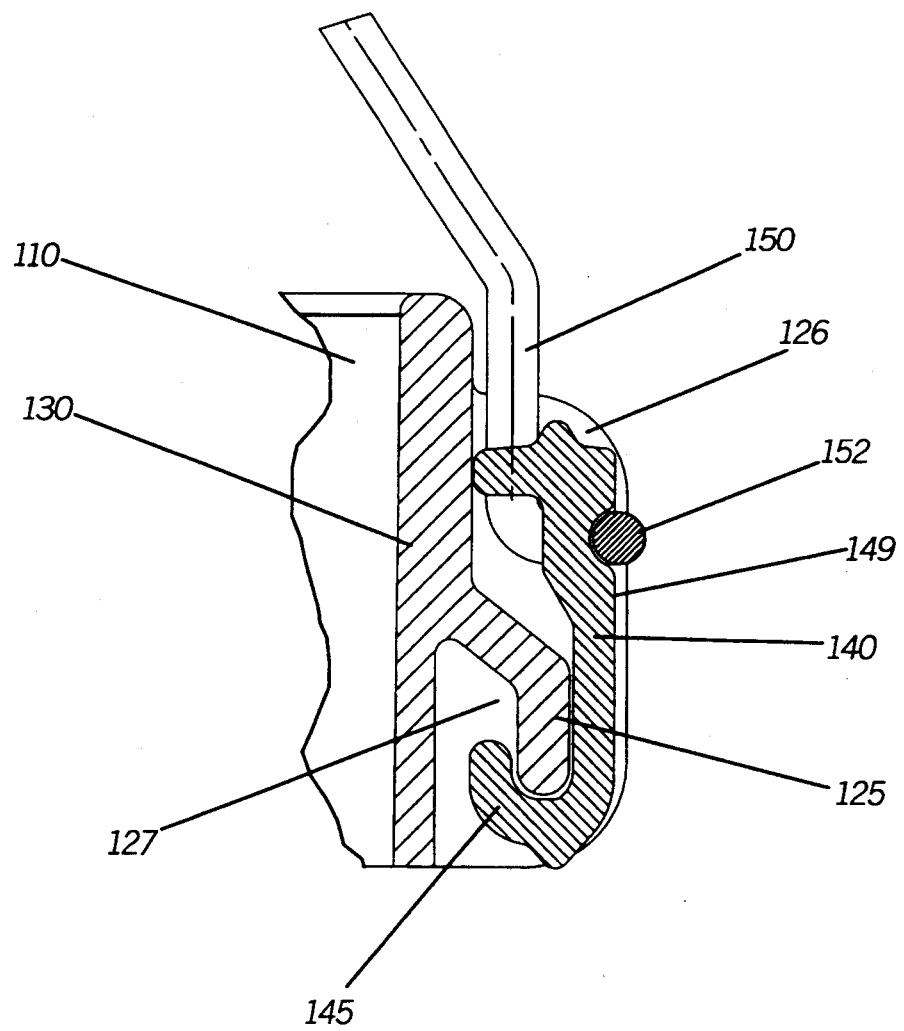
FIG. 4 is a fragmentary cross sectional view of the carry holder of FIG. 1.

Referring to FIG. 4, a fragmentary sectional view of the carry holder 100 is shown, which highlights the interaction between the latch member 140 and the latch retainer 130. The hook portion 145 of the latch member 140 is shown engaged with the hook catch 125 of the latch retainer 130. The latch member 140 is engaged or latched by extending the elastic member 150 such that the hook portion 145 of the latch member 140 extends past the hook catch 125 of the latch retainer 130. Using the flexibility of the elastic member 150, the latch member is pivoted such that the hook portion 145 engages or hooks the hook catch 125. The engagement of the hook portion 145 to the latch retainer is aided by the sloped portion 126 of the hook catch 125. Moreover, as mentioned earlier, a portion 152 of the elastic member 150 is looped about the outer surface 149 of the latch member 140. This configuration of the elastic member 150 and latch member 140 creates a moment on the latch member 140 causing the latch member 140 to angle toward the housing. Consequently, the latch member 130 is oriented toward the latch retainer 140 thereby facilitating the latching process and making inadvertent unlatching less likely. Generally, the presence of a portable product within the pocket 120 of the carry holder 100 causes a vertical force to be exerted on the elastic member 150 such that a taut mechanically coupling between the latch member 140 and the latch retainer 130 is established. To release the latch member 140, an operator would exert a downward force so as to extend the elastic member 150. The latch member 140 is pivoted away from the latch retainer 130, such that the hook portion 145 is disengaged or unhooked from the hook catch 125.

Figure 5:
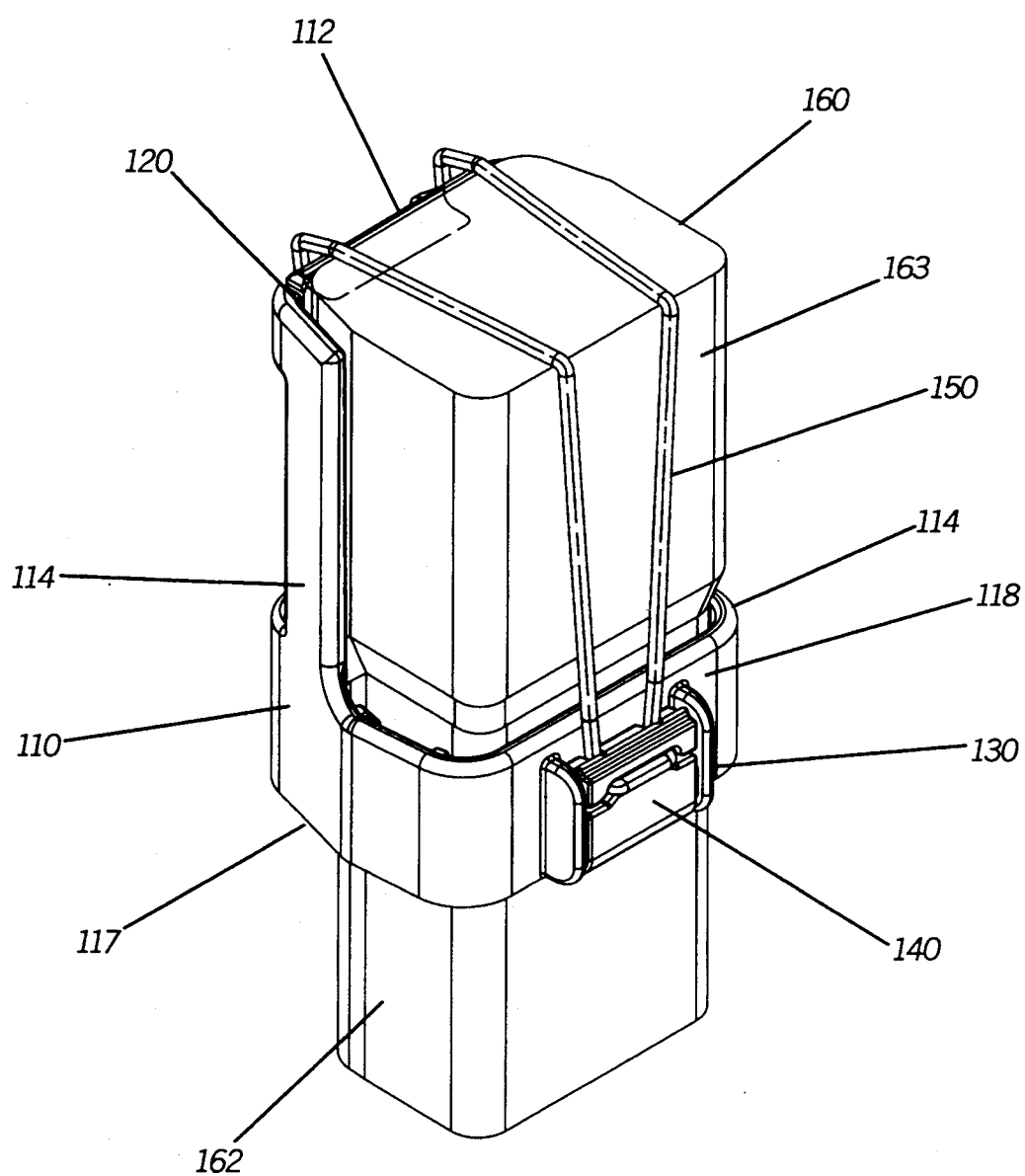
FIG. 5 is a perspective of view of the carry holder of FIG. 1 having a portable product secured within its pocket.

Referring to FIG. 5 the carry holder 100 is shown with a portable product 160 situated securely within the pocket 120. The portable product is a two-way radio which houses communications of circuitry for communicating over a radio frequency channel. The portable radio 160 mounts within the pocket 120 such that a portion 162 extends beyond the base 117 of the carry holder 100 and such that a portion 163 is secured within the pocket 120 of the carry holder 100. Vertical movement of the radio 160 within the carry holder 100 is limited in part by the ridge portion 119 located near the base 117 portion of (see FIG. 1), and by the elastic member 150. Lateral movement of the radio 160 within the pocket 120 is restricted by the rear wall 112, side walls 114, and front wall 118. The elastic member 150, being mechanically coupled to the latch retainer 130 through the latch member 140, further restricts lateral and vertical movement of the radio 160 within the pocket 120 of the carry holder 100. As the elastic member 150 is flexible, it is adaptable to variations in the shapes and dimensions of the radio 160, thus enabling the carry holder 100 to secure products of varying dimensions. Moreover, the elastic member 150 is easily disassembled from the carry holder 100 and a new one substituted if a larger holding capacity is desired for the carry holder 100.

The carry holder 100, including the novel latching mechanism, offers significant advantages over the prior art. The carry holder 100 offers flexibility and convenient operation in a simple and low-cost package. The elastic member 150 and latch member 140 cooperate with the latch retainer 130 to securely position the portable product 160 within the pocket 120 of the carry holder 100. The elastic member 150 can be quickly disassembled from the housing 110 of the carry holder 100, and also from the latch member 140. Thus, the elastic member 150 can be easily replaced if damaged, or if a larger or smaller size elastic member 150 is needed to conform to variations in the product dimension. Yet, this simple and convenient package is designed to be easily manufactured from low cost components. Therefore, a reliable, cost efficient, easily configurable carry holder 100 is provided.

What is claimed is:

1. A carry holder for a portable product, comprising:

a housing having a pocket for receiving the portable product, the housing having first and second slotted portions, each slotted portion having a restricted egress;

a latch retainer integral to the housing;

a latch member formed to engage the latch retainer, the latch member having first and second slotted portions having restricted egresses; and an elastic member comprising a strap having a first portion mounted within the first and second slotted portions of the latch member, and having a second portion mounted within the first and second slotted portions of the housing.

2. A carry holder as defined in claim 1, wherein the elastic member comprises an extendible elongated loop strap.

3. A carry holder as defined in claim 1, wherein the latch retainer comprises at least two wall segments projecting from the housing to limit lateral movement of the latch member when the latch member is engaged with the latch retainer.

4. A carry holder for a portable product, comprising:

a housing having a pocket for receiving the portable product, the housing having first and second slotted portions that extend within the housing in a hook configuration, each slotted portion having a restricted egress;

a latch retainer integral to the housing;

a latch member having a hook portion to engage the latch retainer, the latch member having first and second slotted portions having restricted egresses; and an elastic member having a first portion mounted within the first and second slotted portions of the latch member, and a second portion mounted within the first and second slotted portions of the housing;

the latch member and a portion of the elastic member being pivotable about the pocket such that the latch member is selectively engageable with the latch retainer to secure the portable product within the pocket.

5. A carry holder and portable radio assembly, comprising:

a housing having a pocket, the housing having first and second slotted portions, each slotted portion having a restricted egress;

a latch retainer integral to the housing, the latch retainer comprising a hollow overhang formed on a surface of the housing;

a latch member having a hook portion formed to engage the hollow overhang of the latch retainer, the latch member having first and second slotted portions having restricted egresses;

an elastic member having a first portion mechanically coupled to the latch member via the first and second slotted portions of the latch member, and a second portion mechanically coupled to the housing via the first and second slotted portions of the housing; and a portable radio situated within the pocket;

the latch member and a portion of the elastic member being pivotable about the pocket such that the hook portion of the latch member is engageable with the hollow overhang of the latch retainer to secure the portable radio within the pocket.

* * * * *